US005680761A

United States Patent [19]

Hada et al.

[11] Patent Number: 5,680,761

[45] Date of Patent: Oct. 28, 1997

[54] HYDRAULIC OIL POWER UNIT INCLUDING IMPROVED SWITCHING DEVICE

[75] Inventors: Kimio Hada; Yutaka Izumida; Kazumi Nishizawa, all of Tokyo, Japan

[73] Assignee: Nikko Electric Industry Co., Ltd., Tokyo, Japan

[21] Appl. No.: 688,753

[22] Filed: Jul. 31, 1996

[30] Foreign Application Priority Data

Mar. 21, 1996 [JP] Japan .................................... 8-064208

[51] Int. Cl.[6] ...................................................... F16D 31/02

[52] U.S. Cl. .............................................................. 60/432

[58] Field of Search ............................. 60/423, 431, 432, 60/328

[56] References Cited

U.S. PATENT DOCUMENTS

| | | | |
|---|---|---|---|
| 4,881,371 | 11/1989 | Haeder et al. | 60/431 |
| 5,063,740 | 11/1991 | Aihara | 60/432 |
| 5,117,632 | 6/1992 | Strenzke | 60/431 X |
| 5,335,750 | 8/1994 | Geringer et al. | 60/433 X |

*Primary Examiner*—Hoang Nguyen
*Attorney, Agent, or Firm*—Wenderoth, Lind & Ponack

[57] ABSTRACT

A hydraulic oil power unit includes a motor for driving a hydraulic pump, a piston driven by the hydraulic pump, a driving power supply for the motor and a switch for providing the driving power supply for the motor. A switching device includes a semiconductor for switching on and off a conductive path for the motor, a detecting circuit for detecting the completion of the motion of the piston from a motor current fed with the motor and a holding circuit for holding the switching device in a non-conductive state while the switch is closed based on a detection signal from the detecting circuit indicating a detection of the completion of the motion of the piston.

8 Claims, 6 Drawing Sheets

HYDRAULIC OIL POWER UNIT INCLUDING IMPROVED SWITCHING DEVICE

FIELD OF THE INVENTION

The present invention relates to a hydraulic oil power unit, and more particularly to a hydraulic oil power unit that obviates the necessity of a manually-operated key switch, an electromagnetic contact switch and a safety valve that are required in a conventional hydraulic oil power unit.

PRIOR ART

A conventional hydraulic oil power unit is configured as shown in FIG. 8. In other words, FIG. 8 shows a circuit diagram of a conventional device, in which reference numeral 1 denotes a manually-operated key switch, reference numeral 2 an externally operated push button switch, reference numeral 4 a motor, reference numeral 5 a hydraulic pump, reference numeral 6 an oil tank, reference numeral 7 a selector valve, reference numeral 8 an oil discharge port (A), reference numeral 9 an oil discharge port (B), reference numeral 10 a hydraulic cylinder, reference numeral 11 a safety valve, reference numeral 12 a battery, reference numeral 13 a piston, and reference numeral 14 a power unit.

In a conventional hydraulic oil power unit configured as described above, when an operator closes the manually-operated key switch 1 and the external operation push button switch 2, an electromagnetic contact switch 3 is operated and the motor rotates.

The motor 4 and the hydraulic pump 5 are connected to each other via a coupling not shown, whereby the hydraulic pump 5 is rotated and driven. As the hydraulic pump 5 rotates, hydraulic fluid in the oil tank 6 is sucked into the hydraulic pump 5 and is then discharged from the oil discharge port (A) 8 (or the hydraulic discharge port (B) 9) via the selector valve 7. The hydraulic fluid so discharged is then sent to an oil chamber in the hydraulic cylinder 10 to drive the piston in a reciprocatory fashion, while hydraulic fluid discharged from another oil chamber by the piston 13 returns to the selector valve 7 via the oil discharge port (B) 9 (or the oil discharge port (A) 8) and back into the oil tank 6.

When the reciprocatory motion of the piston 13 is complete, residual hydraulic oil is returned to the oil tank 6 via the safety valve 11.

Here, the manually-operated key switch 1 is needed not only to prevent the motor from being operated when the external operation push switch 2 is mistakenly pressed but also to manually open the circuit of the motor when the circuit of the externally operated push button 2 becomes stuck closed.

In addition, the external operation push switch 2 is a switch for switching the power unit at hand, and is constituted by a switch SW for the motor and a selector valve not shown. In a normal operation, when the motion of the piston 13 is judged to be complete, the operator opens the circuit of the external operation push button switch 2.

However, there is a risk that the switch SW will be stuck closed because the operator will mistakenly continue to close the circuit. In addition, in a case where the piston 13 does not operate in a normal fashion due to leakage of hydraulic fluid in the oil tank, the operator may continuously close the circuit of the external operation push button 2.

In a case where the external operation push button 2 is kept pressed for any of the above-mentioned reasons even after an upward motion (or a downward motion) of the piston 13 is completed, in order to prevent an excessive increase in oil pressure it is necessary for a safety valve 11 to be provided. If no safety valve 11 provided, there is a danger that the hydraulic device will be damaged due to an excessive increase in oil pressure, or that the motor will be burnt out due to an increase in motor current.

Furthermore, the intensity of the operating current of the motor 4 is great, ranging from tens to hundreds of amperes, and if it is desired to switch off and on such a current by a manual switch, the switch must be large, and therefore in order to switch on and off the motor current by a small manual switch, an electromagnetic contact switch must be provided. However, the contact current of the electromagnetic contact switch may exceed an allowable level when the safety valve is operated.

Thus, the conventional hydraulic oil power unit has the following drawbacks:

1. When an upward (or downward) motion of the piston 13 is completed, the safety valve is put into operation, and residual hydraulic fluid is returned to the oil tank 6 via the safety valve 11, which generates noise.
2. When rust or foreign matter becomes affixed to the contact of the electromagnetic contact switch 3 for activating the motor, contact failure may occur with resulting a failure of the motor to operate.
3. When the contact of the electromagnetic contact switch 3 is fused due to over current or heat as a result of a long-time use, the motor is put into continuous operation, resulting in it being thereby burnt out.
4. When the motor is used too frequently, it will be burnt out.
5. When the circuit of the motor is continuously closed because the external operation push switch 2 is stuck or is mistakenly operated, the motor is put into continuous operation and will be burnt out.
6. When the piston 13 does not operate in a normal fashion due to shortage or deterioration of hydraulic fluid in the oil tank, an operator may put the external operation push switch 2 in a continuous closed state, which will burn out the motor.
7. When the piston 13 is put out of operation due to a mechanical obstacle during operation, the motor becomes overloaded and burns out.

The present invention was made to eliminate the aforementioned drawbacks and an object thereof is to provide a hydraulic oil power unit that obviates the necessity of providing a the manually-operated key switch, electromagnetic contact switch and safety valve which are required in a conventional hydraulic oil power unit, thus generating less noise and eliminating a risk of a motor being burnt out, and which is also light in weight and low in production cost.

SUMMARY OF THE INVENTION

The present invention provides a hydraulic oil power unit characterized by a construction in which a semiconductor is used in a switching device for switching on and off a motor current of the power unit, in which the completion of a piston motion is detected through a variation in motor current, and in which the switching device is held open when the circuit for an operation push button switch is kept closed after a lapse of a predetermined period of time (a period of time during which there is caused no burnt-out damage to the motor or there is caused no increase in oil pressure which would rupture the hydraulic system), whereby even if the operation push button switch is mistakenly kept closed, the motor is protected.

The hydraulic oil power unit according to the present invention is further characterized by a construction in which the circuit for the switching device is opened when there occurs no change in motor current even after a period of time that is long enough for the completion of a motion of the piston after the operation push button switch is closed, and further when the circuit for the operation push button switch is closed, thereby obviating a risk of continuous operation of the motor due to shortage or deterioration of hydraulic fluid in the oil tank, whereby the motor can be protected.

The present invention further provides a hydraulic oil power unit characterized by a construction in which a circuit for controlling a current is provided in a current detecting portion for controlling the current such that a motor current flowing when motion of a piston is completed becomes a predetermined value, in which initiation of current control is detected, and in which a circuit for a switching device is held open when a circuit for a push button switch is kept closed even after a lapse of a predetermined period of time, whereby a motor and a hydraulic system can further be protected.

DETAILED DESCRIPTION OF THE INVENTION

Figure 1:
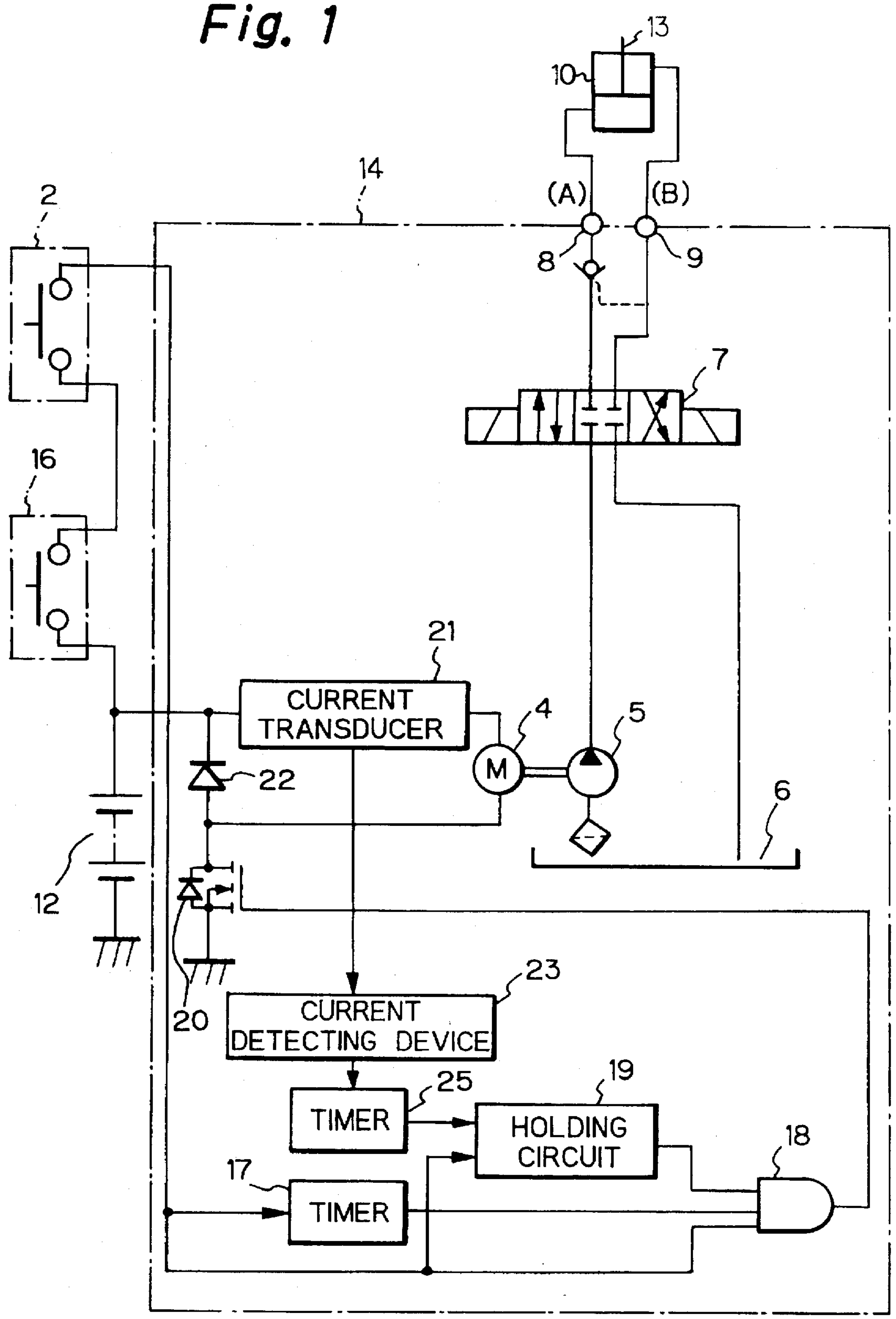
FIG. 1 is a circuit diagram showing the configuration of a main portion of a first embodiment of the present invention.

Referring to the drawings, a first embodiment of the present invention will be described.

Figure 8:
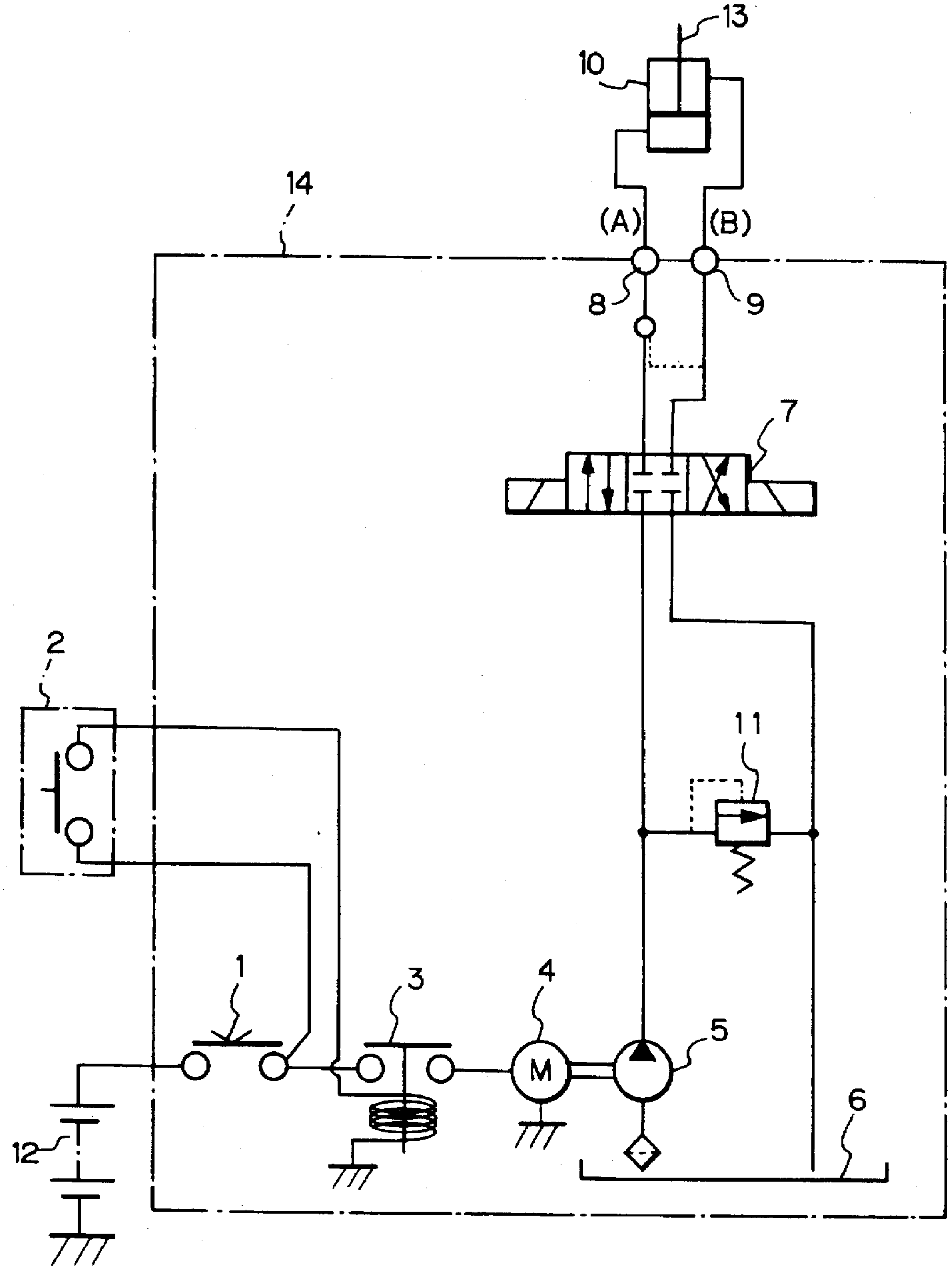
Fig. 8 PRIOR ART
FIG. 8 is a circuit diagram showing the configuration of a conventional device.

FIG. 1 is a circuit diagram showing the configuration of a main portion of the first embodiment of the present invention. In FIGS. 1 and 8, like reference numerals indicate like components.

An operator switch 16 is connected to a battery 12 for preventing the operation of a motor 4 even when an external operation button switch 2 is mistakenly pressed. The external operation push button switch 2 is connected in series to operator switch 16. A timer circuit 17 is connected to external operation push button switch 2 so as to output a signal "1" when a circuit therefor is opened and a signal "0" after a lapse of a predetermined period of time since the circuit for the external operation push button switch is closed (a period of time that is long enough for a piston 13 to complete its motion). Furthermore, the external operation push button switch 2 is connected, respectively, to one input terminal of an AND circuit 18 and one input terminal of a holding circuit 19. In addition, an output of the timer 17 is connected to another input terminal of the AND circuit 18.

An output of this AND circuit 18 is connected to a MOS transistor 20 that is a semiconductor switch for switching on and off a motor current. A current transducer 21 is connected to the motor 4 for converting the motor current to voltage. The battery 12 is connected to this current transducer 21, and it is also connected to the MOS transistor 20 via a fly-wheel diode 22.

An output of this current transducer 21 is connected to a current detecting device 23, an output of this current detecting device 23 is connected to a timer circuit 25, and an output of this timer circuit 25 is connected to the other input terminal of the holding circuit 19. An output of this holding circuit 19 is connected to the other input terminal of the AND circuit 18.

Here, the holding circuit 19 is constructed such that it is fed with outputs from the timer circuit 25 and the external operation push button switch 2, that the circuit is reset when the output from the external operation push button switch 2 is "0" and it outputs a signal "1", that the circuit is set when the output from the timer circuit 25 is "0" and it outputs a signal "0", that it holds a state resulting before the outputs both from the timer circuit 25 and the external operation push button switch 2 become "1" when the outputs from both the timer 25 and the switch 2 are "1", and that it outputs a signal "0" when both outputs become "0" simultaneously.

Fly-wheel diode 22 is configured such that it absorbs a surge voltage that is generated when the motor current is switched off.

The timer circuit 25 is configured such that it outputs a signal "1" when the output from the current detecting device 23 is "0", and that it outputs a signal "0" after a predetermined period of time (1 to 2 seconds) passes after the output from the current detecting device 21 becomes "1".

The current detecting device 23 is constructed such that it is fed with an output from the current transducer 21, that it detects whether or not the motor current reaches a predetermined value, that when it judges that the motor current has not reached the predetermined value yet, the current detecting device 23 outputs a signal "0" and that when it judges that the motor current has reached the predetermined value, the detecting device then outputs a signal "1". The predetermined value is a motor current value obtained when the motion of the piston 13 is completed.

Furthermore, the motor 4 is directly connected to a hydraulic pump 5 via a coupling not shown, and the hydraulic pump 5 is disposed in hydraulic fluid in an oil tank 6. The hydraulic pump 5 is connected to an oil discharge port (A) 8 or an oil discharge port (B) 9 via a selector valve 7, and the oil discharge port (A) 8 is connected to an oil chamber formed by a piston 13, while the oil discharge port (B) 9 is connected to the other oil chamber also formed by the piston 13. In addition, the outflow from the oil discharge port (B) 9 (or the oil discharge port (A) 8) is designed to return to the oil tank 6 via the selector valve 7.

Figure 2:
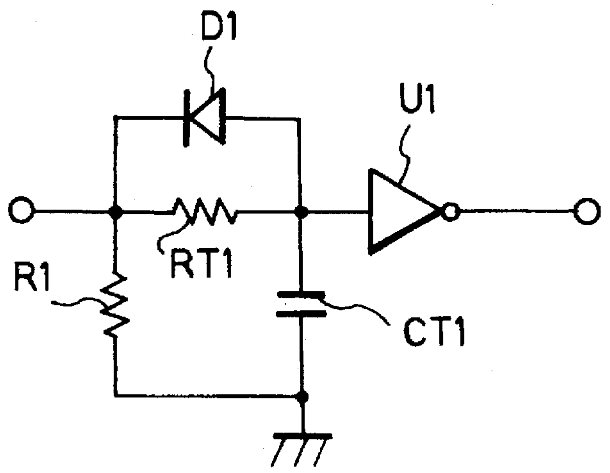
FIG. 2 is a circuit diagram showing the configuration of timer circuits 17, 25.

A circuit diagram showing the configuration of the timer circuits 17, 25 is shown in FIG. 2.

In FIG. 2, R1 denotes a discharge resistance, D1 a discharge diode, RT1 a time-setting resistance, CT1 a time-setting capacitor, and U1 an inverter element.

Time setting is carried out at RT1 and CT1, and a product of the two becomes an approximate set time. The discharge diode D1 is an diode for discharging the electric charge of the time-setting capacitor CT1 as soon as the input becomes "0" from "1".

Figure 3:
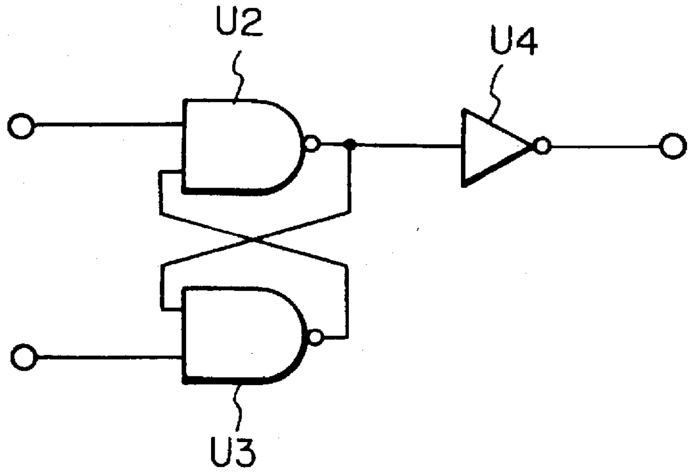
FIG. 3 is a circuit diagram showing the configuration of a holding circuit 19.

A circuit diagram showing the configuration of the holding circuit 19 is shown in FIG. 3.

In FIG. 3, U2 and U3 denote NAND elements and U4 an inverter element.

Figure 4:
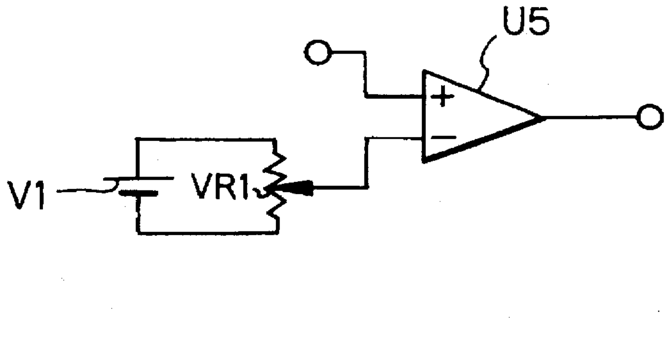
FIG. 4 is a circuit diagram showing the configuration of a current detecting device 23.

A circuit diagram showing the configuration of the current transducer 23 is shown in FIG. 4.

In FIG. 4, U5 denotes a comparator element, V1 a reference voltage source, and VR1 a volume for setting a current.

An operation characteristic of the first embodiment according to the present invention configured as described above will be explained below.

In the explanation below, it is assumed that the driver switch is always closed.

Since there is a signal "0" on one of the inputs of the AND circuit 18 when the external operation push switch 2 is opened, the AND circuit 18 outputs a signal "0" and this puts the MOS transistor 20 into a non-conductive state, the motor 4 being thereby put in a stopped state. In this state, the output from the timer circuit 25 is "1" and therefore the holding circuit 19 is put in a reset state, outputting "1". The timer circuit 17 also outputs "1"

In this state, when the external operation push switch 2 is closed, the holding circuit 19 outputs "1" while remaining in the reset state, and all the inputs into the AND circuit 18 become "1", it outputting "1". This puts the MOS transistor 20 in a conductive state, and the motor 4 is thereby fed with current, whereby the motor 4 and the hydraulic pump 5 are rotated, the piston 13 being thereby driven.

When the motion of the piston 13 is completed, the load of the motor 4 becomes great, and this increases the motor current, and the current transducer 21 outputs a voltage in proportion to the motor current.

When the motor current increases to a set current (predetermined value), the current detecting device 23 outputs "1".

A signal "1" is inputted into the timer circuit 25, and a signal "0" is outputted after a predetermined period of time (1 to 2 seconds).

This puts the holding circuit 19 into a set state and a signal "0" is outputted.

The signal "0" so outputted from the holding circuit 19 is then inputted to the input of the AND circuit 18, and therefore the AND circuit 18 outputs a signal "0". This puts the MOS transistor 20 in a non-conductive state and no current is fed into the motor thereby halting the motor 4.

Immediately the MOS transistor 20 becomes non-conductive, although a surge voltage is generated from the motor 4, the fly-wheel diode 22 absorbs it.

In a case where the surge voltage from the motor 4 is not so high as to damage the respective elements in the power unit, the fly-wheel diode 22 is not required.

When no motor current is flowing, the current detecting device 23 outputs "0" again, and the timer circuit 25 outputs "1". The inputs of the holding circuit 19 become "1", "1" and it is kept in a set state while kept outputting "0".

Thus, as long as the external operation push button switch 2 is kept closed, since the above state is maintained, the motor 4 is held in a halt state. Consequently, even if the external operation push button switch 2 is kept pressed after the motion of the piston 13 is completed because the switch is stuck or otherwise faulty, the motor 4 is automatically stopped, this eliminating a risk of the motor being burnt out. This is one of the characteristics of the present invention.

Here, since the starting current for the motor 4 is normally far greater than that of a current during operation, the starting current is detected by the current detecting device 23 when the motor 4 is started, and the holding circuit 19 is put in a set state, thus halting the motor 4. In order to prevent this from occurring, in the present invention the measuring time of the timer circuit 25 is set to be longer (for instance by 1 to 2 seconds) than the starting time of the motor 4, thereby preventing the occurrence of any malfunction.

The extension of a measuring time by 1 to 2 seconds after the completion of the motion of the piston 13 does not cause a risk of the motor 4 being burnt out and there is no risk, either, of the oil pressure being increased and rupturing the hydraulic system.

In a case where it is desired for the motor 4 to be re-actuated, if the external operation push button switch 2 is first opened (this resets the holding circuit 19) and then is closed, it is restored to its original state for reactuation.

Furthermore, hydraulic fluid is normally sent to hydraulic cylinder 10, but in a case where hydraulic fluid is not sent thereto properly due to shortage of hydraulic fluid in the oil tank due to leakage or the like, there may be a case where the operator continues to press the external operation push button switch 2. In this case, since the motion of the piston is not completed and since there occurs no increase in motor current, the current detecting device 23 continues to output "0".

On the other hand, the timer circuit 17 outputs a signal "0" after a predetermined period of time lapses and the output from the AND circuit 18 becomes "0". This makes the MOS transistor 20 non-conductive and the motor 4 is halted. Therefore, even if the external operation push button switch 2 continues to be pressed (closed) in an abnormal state like this, since the timer circuit 17 continues to output "0", the motor 4 is kept in a halted state, thereby preventing it from burning out. This is one of the characteristics of the present invention.

Moreover, normally, an operator judges completion of the motion of the piston 13 and then opens the external operation push button switch 2, but even if it is not opened because it is mistakenly operated or is stuck, or is kept pressed due to a shortage or deterioration of hydraulic oil in the oil tank 6, the aforementioned operations are performed automatically, and the motor 4 is automatically halted. This state is maintained while the external operation push button switch 2 continues to be closed. This is also one of the characteristics of the present invention.

In addition, when the piston 13 fails to operate properly due to some mechanical obstacle, a change in motor current causes the above action to be performed, whereby the motor 4 can be protected against being burned out. This is also one of the characteristics of the present invention.

A second embodiment of the present invention will be described while referring to the drawings.

Figure 5:
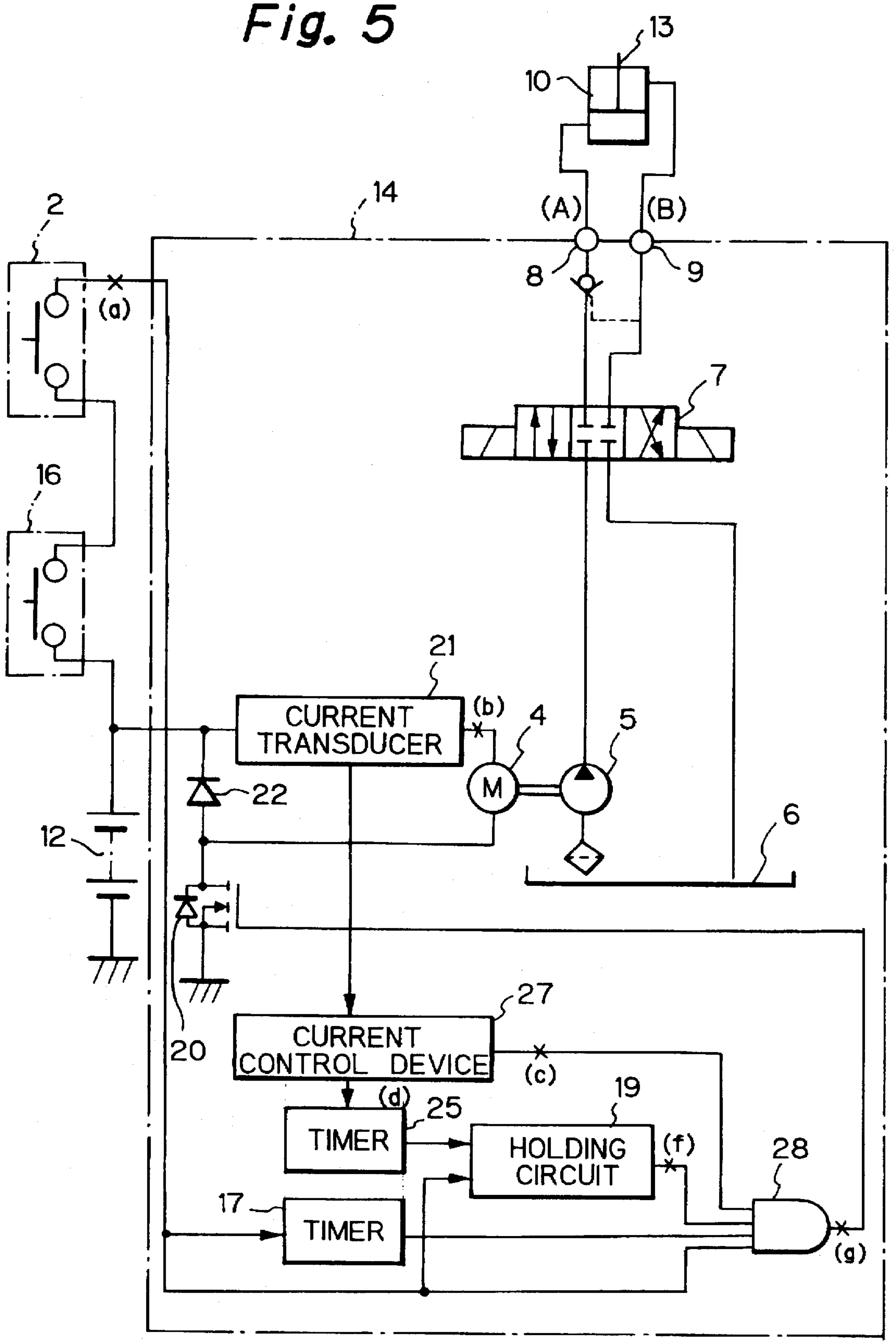
FIG. 5 is a circuit diagram showing the configuration of a main portion of a second embodiment of the present invention.

FIG. 5 is a circuit diagram showing the configuration of a main portion of the second embodiment.

In FIGS. 1, 5 and 8, like reference numerals denotes like components.

When comparing the second embodiment to the first one shown in FIG. 1, the former is characterized in that instead of the current detecting device 23 of the first embodiment a current control device 27 is provided for maintaining the motor current as a constant current and that an output of the device 27 is connected to an AND circuit 28.

In other words, a driver switch 16 is connected to a battery 12 to prevent the operation of a motor 4 even if an external operation push button switch 2 is mistakenly pressed down. The external operation push button switch 2 is connected in series to driver switch 16. A timer circuit 17 is connected to external operation push button switch 2 so as to output a signal "1" when a circuit therefor is opened and a signal "0" after a lapse of a predetermined period of time after the circuit for the external operation push button switch 2 is closed (a period of time that is long enough for a piston 13 to complete its going or returning motion). Furthermore, the external operation push button switch 2 is connected, respectively, to an input terminal of the AND circuit 28 and to one input terminal of a holding circuit 19. In addition, an output of the timer circuit 17 is connected to another input terminal of the AND circuit 28.

An output of this AND circuit 28 is connected to a MOS transistor 20 that is a semiconductor switch for switching on and off a motor current. A current transducer 21 is connected to the motor 4 for converting the motor current to voltage. The battery 12 is connected to this current transducer 21, and it is also connected to the MOS transistor 20 via a fly-wheel diode 22.

An output of this current transducer 21 is connected to the current control device 27, an output of the current control device 27 is connected to the timer circuit 25, and an output of the timer circuit 25 is connected to the other input terminal of holding circuit 19. An output of this holding circuit 19 is connected to another input terminal of the AND circuit 28. In addition, an output of the current control device 27 is connected to the other input terminal of the AND circuit 28.

Here, the holding circuit 19 is constructed such that it is fed with outputs from the timer circuit 25 and external operation push button switch 2, that the circuit is reset when the output from the external operation push button switch 2 is "0", to output a signal "1", that the circuit is set when the output from the timer circuit 25 is "0", to output a signal "0", that it holds a state resulting before the outputs from both the timer circuit 25 and the external operation push button switch 2 become "1" when the outputs from both the timer circuit 25 and the external operation push button switch 2 are "1", and that it outputs a signal "0" when the both outputs become "0" simultaneously.

The fly-wheel diode 22 is configured such that it absorbs a surge voltage that is generated when the motor current is opened.

The timer circuit 25 is configured such that it outputs a signal "1" when the output from the current control device 27 is 0 and that it outputs a signal "0" after a predetermined period of time (1 to 2 seconds) passes after the output from the current control device 27 becomes "1".

The current control device 27 characteristic of the second embodiment is constructed such that it is fed with an output from the current transducer 21, that it outputs (output c) a signal "1" to the AND circuit 28 when what is inputted is equal to or less than a lower limit of a predetermined value, that it output (outputs c) a signal "0" to the AND circuit 28 when what is inputted is equal to or more than an upper limit of the predetermined value, that it outputs (output d) a signal "1" to the circuit 25 when the output from the current transducer 21 goes up above and down below the upper and lower limits of the predetermined value (pulsation), and that it outputs (output d) a signal "0" to the timer circuit 25 when the output from the current transducer 21 does exceed those limits.

In addition, the motor 4 is directly connected to a hydraulic pump 5 via a coupling not shown, and the hydraulic pump 5 is disposed in hydraulic fluid in an oil tank 6. The hydraulic pump 5 is connected to an oil discharge port (A) 8 or to an oil discharge port (B) 9 via a selector valve 7, and the oil discharge port (A) 8 is connected to one oil chamber formed by a piston 13 and the oil discharge port (B) 9 is connected to the other oil chamber formed by the piston 13. In addition, the outflow of the oil discharge port (B) 9 (or the oil discharge port (A) 8) is designed to be returned to the oil tank 6 via the selector valve 7.

Figure 6:
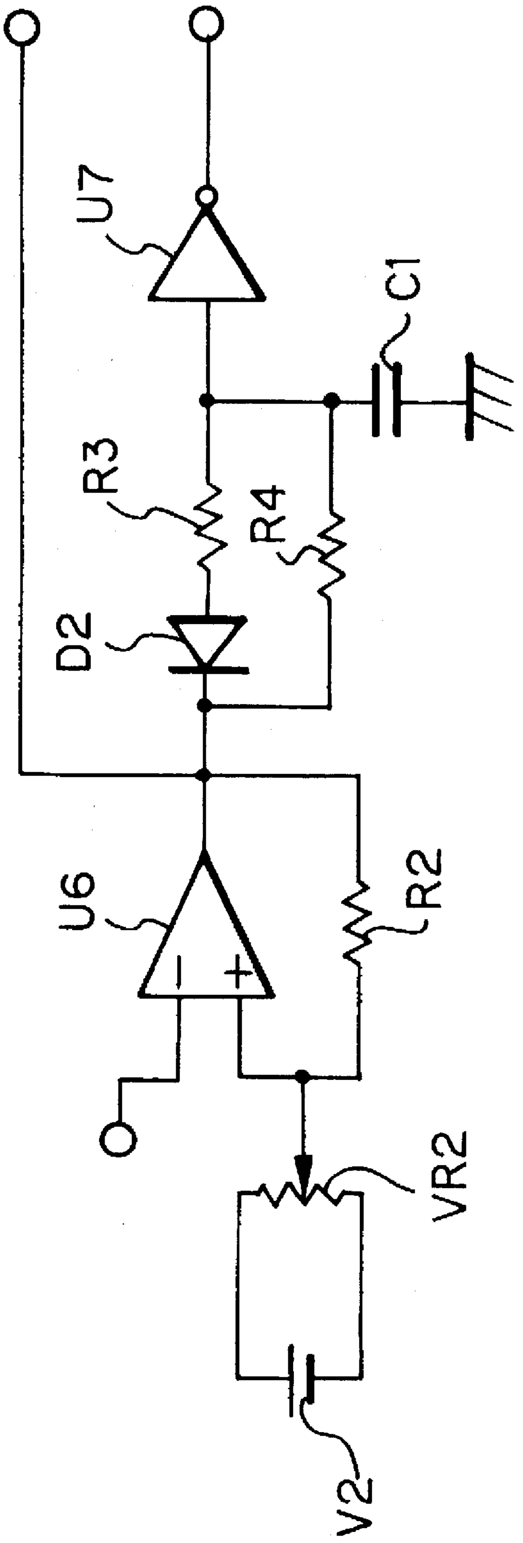
FIG. 6 is a circuit diagram showing the configuration of a main portion of a current control device 27.

A circuit diagram showing the configuration of a main portion of the current control device 27 is shown in FIG. 6.

In FIG. 6, U6 denotes a comparator element, V2 a reference voltage, VR2 a voltage setting volume, D2 a diode, R2 a hysteresis resistance, R3, R4 a resistance, C1 a capacitor and U7 an inverter element, respectively. In addition, R3 and R4 are set such that R3 is smaller than R4 (R3<R4). A time constant of C1×R4 is set such that it becomes larger than a period which is on-off cycle of the MOS transistor.

Figure 7:
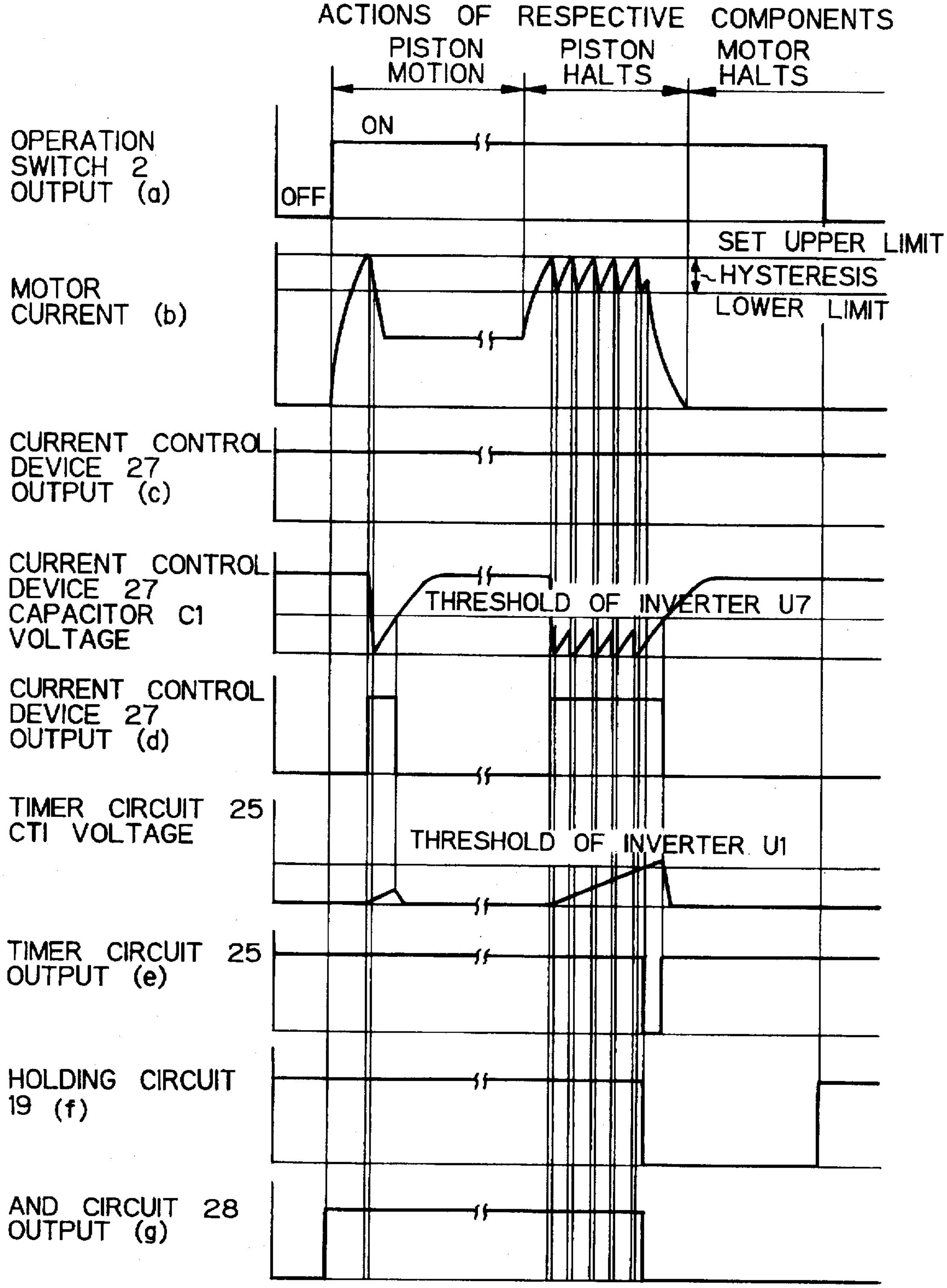
FIG. 7 is a single graph showing wave forms of signals of respective points indicated by "X" in FIG. 5, the voltage of the capacitor CT1 of the timer circuit 25 shown in FIG. 2 and the voltage of the capacitor CT1 of the current control device 27 shown in FIG. 6 from a time when a circuit for an external operation push button switch 2 is closed when the motor current is controlled, and the motor current is opened by the timer circuit 25 until a time when the circuit for the external operation push button switch is opened.

FIG. 7 shows signal wave forms of respective points indicated by "X" in FIG. 5, the voltage of the capacitor CT1 of the timer circuit 25 shown in FIG. 2 and the voltage of the capacitor C1 of the current control device 27 shown in FIG. 6 from time when a circuit for an external operation push button switch 2 is closed when the motor current is controlled, and the motor current is switched off by the timer circuit 25 until time when the external operation push button switch 2 is opened.

An operation characteristic of the second embodiment configured as described above will be described below.

Since there is a signal "0" on one of the inputs of the AND circuit 28 when the external operation push button switch 2 is opened, the AND circuit 28 outputs a signal "0" and the MOS transistor 20 is put in a non-conductive state, the motor 4 being stopped.

In this state, the output (c) from the current control device 27 is "1" and the output (d) is "0". Since the input is "0", the timer circuit 25 outputs a signal "1" to the holding circuit 19. This puts the holding circuit 19 in a reset state and the holding circuit 19 outputs a signal "1" to the AND circuit 28. In addition, the timer circuit 17 outputs a signal "1". Therefore, the motor 4 is put in a halt state.

Now, the operator closes the external operation push button switch 2, the holding circuit 19 outputs a signal "1" while being kept in the reset state, and all of the inputs of the AND circuit 28 become "1", the AND circuit 28 outputting "1". This puts the MOS transistor 20 in a conductive state, the motor 4 is fed with current, the motor 4 and the hydraulic pump 5 are rotated, and the piston 13 is driven.

When the motion of the piston 13 is completed (a timing when the piston is halted in FIG. 7), the load of the motor 4 becomes great, the motor current is increased, and the current transducer 21 outputs a voltage in proportion to the motor current. When the motor current reaches an upper limit value (a set upper limit in FIG. 7) of a set current for the current control device 27, the output (c) of the current control device 27 becomes "0", and the output from the AND circuit 28 also becomes "0", the MOS transistor 20 being put in a non-conductive state.

In this state, when the motor current starts to decrease and reaches to a lower limit value (a set lower limit in FIG. 7) of a set current for the current control device 27, the output (c) of the current control device 27 becomes "1", and the output of the AND circuit 28 becomes "1". This puts the MOS transistor 20 in a conductive state again.

There is provided hysteresis in the set current for the current control device 27 when the motor current increases and decreases. The upper limit value of the hysteresis is set at such a value as the motor does not get burnt out and the respective portions of the device do not get damaged due to increase in oil pressure, while the lower limit value is set so as to be greater than the normal operation current.

In the second embodiment, since the motor current is maintained as a constant current that falls within the above-mentioned range, it is possible to further protect the motor 4 and the hydraulic system. Moreover, it is also possible to maintain a period during which the MOS transistor is put in conductive/non-conductive states, thus making it possible to prevent the semiconductor from being damaged.

On the other hand, since the motor current goes up above and down below the set value of the current control device 27, the output (d) of the current control device 27 becomes "1", and this signal "1" is inputted into the timer circuit 25, the timer circuit 25 outputting a signal "0" to the holding circuit 19 after a lapse of a predetermined period of time (1 to 2 seconds).

The holding circuit 19 is put in a set state depending on input conditions, and it outputs a signal "0" to the AND circuit 28.

Since a signal "0" is inputted into the input of the AND circuit 28, the AND circuit 28 outputs a signal "0", the MOS transistor is put in a non-conductive state, and this stops the motor current flowing, the motor 4 being thus halted.

When the motor current stops flowing, the output (d) of the current control device 27 outputs again a signal "0", and the timer circuit 25 outputs a signal "1". Although input signals to the holding circuit 19 become "1" and "1", the set state is kept and the holding circuit 19 is kept outputting "0".

Therefore, as long as the external operation push button switch continues to be pressed down, since this state is maintained, the motor 4 is maintained in a halt state.

When it is desired that the motor 4 be re-actuated, if the external operation push button switch is first opened (the holding circuit 19 is reset) and then is closed, the motor is restored to its initial state for reactuation.

As has been described above, the present invention is characterized by a construction in which a semiconductor is used in the switching device for switching off and on the motor current for driving the hydraulic pump, in which the motor is driven by a command from the external operation push button switch, in which the completion of a going motion or a returning motion of the piston adapted to be driven by the hydraulic pump is detected through a change in the motor current, in which it is detected by the timer circuit that the external operation push button switch is still kept in the closed state even after a lapse of a predetermined period of time after a predetermined current value is exceeded, and in which the semiconductor switch is kept non-conductive by the holding circuit for holding the detection by the timer circuit until the external operation push button switch is opened.

In addition, the present invention is characterized by a construction in which the timer circuit detects that there occurs no change in the motor current even after a period of time that is long enough for a motion of the piston to be completed passes after the external operation push button switch is closed and that the external operation push button switch is kept in the closed state, whereby the semiconductor switch is put in a non-conductive state.

Furthermore, the present invention is characterized by a construction in which the semiconductor switch is made non-conductive when the motor current is greater than a predetermined value, while it is made conductive when the motor current is smaller than the predetermined value, in which a current control device is provided for controlling the motor current so as to stay at the predetermined value, in which a detection circuit for detecting the initiation of control of current is provided in the current control device, in which it is detected by the timer circuit that the external operation push button switch is still kept in the closed state even after a predetermined period of time passes after the detection circuit detects the initiation of control of current, and in which the semiconductor switch is kept non-conductive by the holding circuit for holding the detection by the timer circuit until the external operation push button switch is opened.

Therefore, even in a case where the operation push button switch mistakenly continues to be pressed down, it is possible to protect the motor against burn-out or the like.

In addition, there is no risk of the motor continuing to be operated due to a shortage or deterioration of hydraulic fluid inside the oil tank, thus making it possible to protect the motor.

Furthermore, it is possible to further protect the motor and the hydraulic system.

Moreover, since there is no need to provide a safety valve, it is possible to prevent the generation of noise.

In addition, since the motor is actuated by the semiconductor switch, it is possible to eliminate contact failure to thereby improve the reliability and also possible to avoid a risk of the motor being burnt out due to contact welding.

Furthermore, it is possible to make the device lighter and smaller, and to reduce production costs. Thus, many advantages can be provided by the present invention.

What is claimed is:

1. A hydraulic oil power unit comprising a motor for driving a hydraulic pump,
   - a piston driven by said hydraulic pump, and
   - a driving power supply for said motor, said hydraulic oil power unit further comprising:
     - a switching device comprising a semiconductor for switching on and off a conductive circuit for said motor;
     - an external operation switch for an operator to instruct switching on and off of said switching device;
     - detecting means for detecting the completion of the motion of said piston from motor current fed into said motor; and
     - a holding circuit for holding said switching device in a non-conductive state based on a signal from said detecting means indicating the completion of the motion of said piston while said external operation switch is kept in a closed state.

2. A hydraulic oil power unit as set forth in claim 1, wherein said means for detecting the completion of the motion of said piston from motor current fed into said motor comprises:
   - a current transducer for detecting that a motor current reaches a predetermined value which is set as a value obtained when the motion of said piston is completed; and a timer actuated by a predetermined value detection signal from said current transducer and designed to output a detection output indicating the detection of the completion of the motion of said piston after measuring a predetermined period of time.

3. A hydraulic oil power unit as set forth in claim 1, further comprising:

a timer for outputting a detection output indicating a detection of the completion of the motion of said piston after a period of time that is sufficient for said piston to complete its motion is measured after said external operation switch is closed; and a circuit for putting said switching device in a non-conductive state by a detection output from said timer indicating the detection of the completion of the motion of said piston or a non-conductive signal held in said holding circuit while said external operation switch is kept in a closed state.

4. A hydraulic oil power unit comprising a motor for driving a hydraulic pump, a piston driven by said hydraulic pump, and a driving power supply for said motor, said hydraulic oil power unit further comprising:

a switching device comprising a semiconductor for switching on and off a conductive circuit for said motor;

an external operation switch for an operator to instruct switching on and off of said switching device;

a timer for outputting a detection output indicating a detection of the completion of the motion of said piston after a period of time that is sufficient for said piston to complete its motion is measured after said external operation switch is closed; and a circuit for putting said switching device in a non-conductive state based on a detection output from said timer indicating a detection of the completion of the motion of said piston while said external operation switch is kept in a closed state.

5. A hydraulic oil power unit comprising a motor for driving a hydraulic pump, a piston driven by said hydraulic pump, and a driving power supply for said motor, said hydraulic oil power unit further comprising:

a switching device comprising a semiconductor for switching on and off a conductive circuit for said motor;

an external operation switch for an operator to instruct switching on and off of said switching device;

a current transducer for detecting that a motor current reaches a predetermined value which is set as a value obtained when the motion of said piston is completed;

a first timer actuated by a predetermined value detection signal from said current transducer, and designed to output a detection output indicating a detection of the completion of the motion of said cylinder piston after measuring a predetermined period of time and a non-detection output indicating a non-detection of the completion of the motion of said piston when a non-detection signal is inputted from said current transducer;

a second timer for outputting a detection output indicating a detection of the completion of the motion of said piston after measuring a period of time that is sufficient for the piston to complete its motion after said external operation switch is closed;

a holding circuit into which a detection output or a non-detection output from said first timer indicating a detection or a non-detection of the completion of the motion of said piston and a signal indicating the opened or closed state of said external operation switch are respectively inputted for holding a non-conduction signal for putting said switching device in a non-conductive state after a detection output indicating a detection of the completion of the motion of said piston is inputted in a case where said external operation switch is in a closed state; and a circuit for putting said switching device in a non-conductive state in a case there is existing any of a non-conduction signal from said holding circuit, a detection output from said second timer indicating a detection of the completion of the motion of said piston and a signal indicating the opened state of said external operation switch.

6. A hydraulic oil power unit comprising a motor for driving a hydraulic pump, a piston driven by said hydraulic pump, and a driving power supply for said motor, said hydraulic oil power unit further comprising:

a switching device comprising a semiconductor for switching on and off a conductive circuit for said motor;

an external operation switch for an operator to instruct switching on and off of said switching device;

a current control circuit for providing a predetermined range for a motor current that flows when the motion of said piston is completed and outputting a signal indicating that the switching device is in a non-conductive state when said motor current is above an upper limit value of said predetermined range, outputting a signal indicating that said switching device is in a conductive state when said motor current is below a lower limit value of said predetermined range and outputting a detection signal for detecting that the motor current is being controlled when the motor current pulsates within said predetermined range;

a timer actuated based on a detection signal from said current control device and designed to output a detection output indicating a detection of the completion of the motion of said piston after measuring a predetermined period of time; and a holding circuit for holding said switching device in a non-conductive state based on a detection signal from said timer indicating a detection of the completion of the motion of said piston while said external operation switch is kept in a closed state.

7. A hydraulic oil power unit comprising a motor for driving a hydraulic pump, a piston driven by said hydraulic pump, and a driving power supply for said motor, said hydraulic oil power unit further comprising:

a switching device comprising semiconductor for switching on and off a conductive circuit for said motor;

an external operation switch for an operator to instruct switching on and off of said switching device;

a current control circuit for providing a predetermined range for a motor current that flows when the motion of said piston is completed and outputting a signal indicating that the switching device is in a non-conductive state when said motor current is above an upper limit value of said predetermined range, outputting a signal indicating that said switching device is in a conductive state when said motor current is below a lower limit value of said predetermined range and outputting a detection signal for detecting that the motor current is being controlled when the motor current pulsates within said predetermined range;

a first timer actuated by said detection signal from said current control device, and designed to output a detection output indicating a detection of the completion of the motion of said piston after measuring a predetermined period of time and a non-detection output indicating a non-detection of the completion of the motion of said piston when a non-detection signal is inputted from said current transducer;

a second timer for outputting a detection output indicating a detection of the completion of the motion of said piston after measuring a period of time that is sufficient for the piston to complete its motion after said external operation switch is closed;

a holding circuit into which a detection output or a non-detection output from said first timer indicating a detection or a non-detection of the completion of the motion of said piston and a signal indicating the opened or closed state of said external operation switch are respectively inputted for holding a non-conduction signal for putting said switching device in a non-conductive state after a detection output indicating a detection of the completion of the motion of said piston is inputted in a case where said external operation switch is in a closed state; and a circuit for putting said switching device in a non-conductive state in a case there is existing any of a non-conduction signal from said holding circuit, a detection output from said second timer indicating a detection of the completion of the motion of said piston, a signal from said current control circuit indicating a non-conduction and a signal indicating the opened state of said external operation switch.

8. A hydraulic oil power unit as set forth in claim 2, further comprising:

a timer for outputting a detection output indicating a detection of the completion of the motion of said piston after a period of time that is sufficient for said piston to complete its motion is measured after said external operation switch is closed; and a circuit for putting said switching device in a non-conductive state by a detection output from said timer indicating the detection of the completion of the motion of said piston or a non-conductive signal held in said holding circuit while said external operation switch is kept in a closed state.

* * * * *